United States Patent
De Luca

(10) Patent No.: US 8,538,388 B2
(45) Date of Patent: Sep. 17, 2013

(54) WIRELESS SATELLITE DIGITAL AUDIO RADIO SERVICE (SDARS) HEAD UNIT WITH PORTABLE SUBSCRIPTION AND CELL PHONE ABILITIES

(75) Inventor: Michael J. De Luca, Boca Raton, FL (US)

(73) Assignee: Sirius XM Radio Inc., New York, NY (US)

( * ) Notice: Subject to any disclaimer, the term of this patent is extended or adjusted under 35 U.S.C. 154(b) by 2150 days.

(21) Appl. No.: 11/233,583

(22) Filed: Sep. 22, 2005

(65) Prior Publication Data

US 2006/0240811 A1 Oct. 26, 2006

Related U.S. Application Data

(60) Provisional application No. 60/674,474, filed on Apr. 25, 2005.

(51) Int. Cl.
H04M 3/42 (2006.01)

(52) U.S. Cl.
USPC ..... 455/414.1; 455/3.01; 455/3.02; 455/3.03; 370/341

(58) Field of Classification Search
USPC ..................... 455/3.02, 3.03, 414.1
See application file for complete search history.

(56) References Cited

U.S. PATENT DOCUMENTS

| | | | |
|---|---|---|---|
| 3,848,193 A | 11/1974 | Martin et al. | |
| 4,023,017 A | 5/1977 | Ceseri | |
| 4,117,405 A | 9/1978 | Martinez | |
| 4,417,349 A | 11/1983 | Hills et al. | |
| 4,513,415 A | 4/1985 | Martinez | |
| 5,133,081 A | 7/1992 | Mayo | |
| 5,475,866 A | 12/1995 | Ruthenberg | |
| 5,513,384 A | 4/1996 | Brennan et al. | |
| 5,721,783 A | 2/1998 | Anderson | |
| 6,009,096 A | 12/1999 | Jaisingh et al. | |
| 6,529,740 B1 | 3/2003 | Ganucheau, Jr. et al. | |
| 6,591,111 B1 | 7/2003 | Stosz et al. | |
| 6,799,201 B1 * | 9/2004 | Lee et al. | 709/217 |
| 6,904,264 B1 * | 6/2005 | Frantz | 455/3.04 |
| 2001/0055950 A1 * | 12/2001 | Davies et al. | 455/41 |
| 2003/0204577 A1 * | 10/2003 | Videtich | 709/221 |
| 2004/0192302 A1 | 9/2004 | Achour et al. | |
| 2004/0199387 A1 | 10/2004 | Wang et al. | |

(Continued)

FOREIGN PATENT DOCUMENTS

JP 10145474 A 5/1998

*Primary Examiner* — Lester Kincaid
*Assistant Examiner* — Isaak R Jama
(74) *Attorney, Agent, or Firm* — Kramer Levin Naftalis & Frankel LLP

(57) ABSTRACT

A system and method for automated activation of a radio, or content receiver, used to receive subscription radio services such as XM or Sirius radio. A wireless communications device with a short range data link wirelessly communicates with the content receiver to control the content receiver and receive a unique identification code from the content receiver. The wireless communications device also has its own unique identification code. The wireless communications device transmits an activation request message over a long range wireless communications link to a control station. The activation request message contains the receivers unique identification code and the communications device's own unique identification code. The control station maintains a database of valid identification codes that is used to authenticate the request. If the control station receives a valid request, an activation signal is sent to the receiver to allow operation of the receiver.

28 Claims, 9 Drawing Sheets

(56) References Cited

U.S. PATENT DOCUMENTS

| | | |
|---|---|---|
| 2005/0097624 A1 | 5/2005 | Salo et al. |
| 2005/0107035 A1* | 5/2005 | Zoeckler ............... 455/12.1 |
| 2005/0215194 A1* | 9/2005 | Boling et al. .......... 455/3.02 |
| 2006/0224701 A1* | 10/2006 | Camp .................... 709/219 |

* cited by examiner

WIRELESS SATELLITE DIGITAL AUDIO RADIO SERVICE (SDARS) HEAD UNIT WITH PORTABLE SUBSCRIPTION AND CELL PHONE ABILITIES

CROSS-REFERENCE TO RELATED APPLICATIONS

This application is based upon and claims priority from prior U.S. Provisional Application No. 60/674,474 entitled "Wireless SDARS Head Unit with Portable Subscription and Cell Phone Abilities," filed on Apr. 25, 2005 the entire disclosure of which is herein incorporated by reference in its entirety.

BACKGROUND OF THE INVENTION

1. Field of the Invention

This invention generally relates to controlling and activating satellite media service receivers and more specifically to controllers combining wireless control of satellite media service receivers with transmission of service activation requests for the controlled satellite media service receiver.

2. Description of Related Art

Advances in technology have caused advances in subscription radio services that provide radio services to radio receivers, referred to herein as a subscription receivers, that require activation prior to operation. An example of such a subscription radio service is Satellite Digital Audio Radio Service (SDARS), including system operated by Sirius Satellite Radio, Incorporated and XM Satellite Radio Holdings, Incorporated. In the example of SDARS, a specialized subscription receiver is purchased and the user pays a monthly subscription fee to maintain activation of the subscription receiver and to thereby be able to receive the programming available through the subscription radio service. These radios are commonly mounted in motor vehicles, homes, offices and other places where audio entertainment is desired.

In order for a user to enjoy subscription radio services in more than one location or installation, the user has limited choices. The user can utilize a portable subscription receiver that can be carried and mounted at the various locations, often using a specialized mounting base or other installation to facilitate use and movement of the portable subscription receiver among the multiple locations. Carrying this portable subscription receiver can be inconvenient for the user. Another option is to purchase and activate a separate subscription receiver for each location. Although a user may be willing to purchase multiple receivers, the user may not want to pay the recurring subscription charge required to keep all of the radios activated. A user owning multiple subscription receivers will also be required to configure each of these subscription receivers with his or her preferences, such as preset channels, favorite songs, volume settings, and the like. This can be time consuming and discourages a user from changing these configuration items. Further, the configuration of the user preferences programmed into each of the multiple receivers may become different from one another, such as having different preset channels and the like, as the user changes these on one subscription receiver and not the others. This can lead to confusion and frustration for the user who will not be sure of which received channel corresponds to the various channel preset selections of each subscription receiver.

Therefore a need exists to overcome the problems with the prior art as discussed above.

SUMMARY OF THE INVENTION

Briefly, in accordance with the present invention, a method on a wireless communications device for controlling and requesting activation of a subscription activated media receiver includes providing, through a first wireless connection, control of a subscription activated media receiver from a wireless communications device. The wireless communications device is separate from the subscription activated media receiver. The method further includes receiving, through the first wireless connection, at least one subscription receiver identifier from the subscription activated media receiver. The method also includes transmitting, through a second wireless connection, at least one activation request message from the wireless communications device to at least one subscription service provider. The activation request message includes the subscription receiver identifier and at least one controller identifier for identifying at least one account associated with the wireless communications device.

In accordance with another aspect of the present invention, a computer implemented method that is performed on a computer coupled to a subscription media transmitter, the method being used to process at least one activation request message for at least one subscription activated media receiver, includes storing at least one controller identifier, where each of the at least one controller identifier is associated with a respective controller authorized to request activation of subscription activated media receivers. The method further includes accepting at least one activation request message that includes at least one requesting subscription receiver identifier and at least one requesting controller identifier. The activation request message having been received over a telecommunications link. The method further includes validating the activation request message received over the first wireless link and transmitting over a wireless broadcast channel, in response to the validating of the message, at least one activation signal to a first subscription media receiver that is associated with the requesting subscription receiver identifier.

BRIEF DESCRIPTION OF THE DRAWINGS

In the accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DESCRIPTION OF THE PREFERRED EMBODIMENTS

Figure 1:
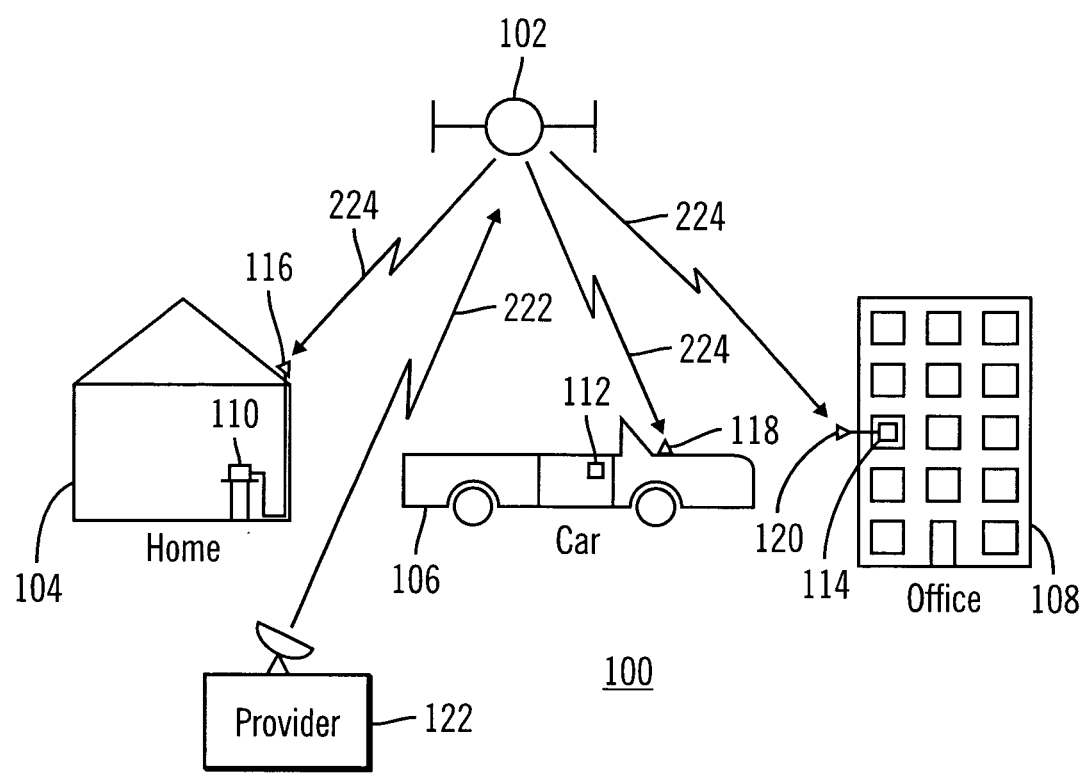
FIG. 1 is an overall system diagram of a satellite media service in accordance with an exemplary embodiment of the present invention.

The exemplary embodiments of the present invention provide a portable subscription receiver activation system whereby a user is able to activate and deactivate subscription receivers through the use of a portable, wireless communications device, such as a cellular phone that incorporates a Personal Digital Assistant (PDA), i.e., a cellular phone/PDA that includes a Bluetooth interface described as a first wireless connection in the following discussion. In an exemplary embodiment, the wireless communications device establishes a wireless link with a subscription receiver over a Bluetooth interface. The cellular phone/PDA queries the subscription receiver for its identification value, which is typically an alphanumeric string that uniquely identifies the subscription receiver. The cellular phone/PDA further includes another identifier that is associated with either the wireless communications device or with the individual user, such as its telephone number, Electronic Identification Number (EIN), user account number, and the like. The identifier stored in the cellular phone/PDA uniquely identifies that device, and thereby also identifies the user in possession of the device. The identifier stored in the cellular phone/PDA is used by the subscription radio service provider to identify the user and the user's account to which the activation is to be charged or under which the activation is to be authorized. The cellular phone/PDA then transmits an activation request message for the subscription receiver to the subscription radio service provider over a cellular phone link, which is discussed as a second wireless connection in the following discussion. The activation request message in this example is a digital data message that includes the subscription receiver identification value and the other identifier identifying the wireless communications device or the user. Upon receipt of the activation request message, the subscription radio service provider, such as a SDARS provider, validates the message and if valid, transmits an activation signal to the subscription receiver over the SDARS link. The user of the cellular phone/PDA is then able to listen with the subscription receiver, which is now activated.

In the above example, the subscription receiver may be located, for example, in the user's home. The user is then able to move to a different location, with the cellular phone/PDA, where a second subscription receiver is located, such as into the user's car. Upon entry into the car, the cellular phone/PDA is able to establish a Bluetooth link to a subscription receiver in the user's car and repeat the activation request processing described above. Processing at either the subscription radio service provider or within the cellular phone/PDA tracks that this user is requesting activation of a second subscription receiver and upon activating the second subscription receiver, transmits a deactivation signal to the previously activated subscription receiver, i.e., the subscription receiver in the user's home in this example. The subscription radio service provider is able to track these activations and bill for various options, such as the ability to use this portable subscription service and/or bill for the number of unique receivers activated by a particular user.

An example of the operation of the exemplary embodiments includes linking specific subscription receivers, such as subscription receivers owned by a particular user, to a wireless communications device. In this example, a user is only able to successfully request activation for subscription receivers linked to his or her account with the subscription radio service provider. This prevents a user from successfully requesting activation of, for example, a friend's subscription receiver. These exemplary embodiments of the present invention may further include an ability to define "public subscription radios" that are radios that can be successfully activated by any wireless communications device. Such public subscription radios may be located, for example, in places such as restaurants, coffee houses, hotels, and like places where a series of individuals are likely to be for relatively short periods of time. The subscription radio service provider may elect to charge a user for activation of each public subscription radio or for the ability to be able to activate any public subscription radio.

Another aspect of the present invention includes tracking usage statistics for a user, such as channels selected and the time of day these channels were selected for a particular user. The wireless communications device is then able to transmit these usage statistics to the subscription service provider or to another data collection entity when sending the activation request message.

Referring now in more detail to the drawings in which like numerals refer to like parts throughout several views, FIG. 1 illustrates an overall system diagram of a satellite media service 100 in accordance with an exemplary embodiment of the present invention. The satellite media service 100 includes at least one satellite 102 and more generally consists of a plurality of satellites operated by subscription satellite providers, such as the SDARS providers. Each subscription satellite provider in this exemplary embodiment, such as Sirius Satellite Radio, Incorporated or XM Satellite Radio Holdings, Incorporated, operates one or more central ground stations 122. In order to simply the illustrations of the exemplary embodiments of the present invention, the following discussion refers to the subscription radio service providers as being included in the central ground stations 122. It is clear in light of the present discussion that the subscription radio service providers are able to be distributed over several locations that include multiple central ground stations, data processing facilities, and the like.

The central ground stations 122 of the exemplary embodiment transmit one or more uplink broadcast signals 222 that contain programming data, such as audio programs or other multi-media programming data, to satellite 102. The uplink broadcast signals 222 transmitted by the central ground stations 122 further contain activation signals that are addressed to the various subscription receivers, described below, that activate and deactivate selected subscription receivers. The satellite 102 of the exemplary embodiment receives the uplink broadcast signals 222 and retransmits downlink broadcast signals 224 back to earth. The satellite 102 of the exemplary embodiment transmits broad radiation beam downlink broadcast signals 224 that covers a relatively wide geographic area such as the continental Unites States. Further embodiments of the present invention are able to transmit narrow beam downlink broadcast signals 224 that have a more narrow geographic coverage. Furthermore, ground based repeaters (not shown) transmit signals from received provider 122 to supplement reception of the downlink broadcast signals 224 in areas less conducive to satellite reception, such as metropolitan areas. It is further clear in light of the present discussion that further embodiments of the present invention are able to operate with terrestrial radio broadcasts and other media distribution systems.

The Downlink broadcast signals 224 are received by multiple subscription receivers located at various locations and in various types of installations. The illustrated exemplary embodiment shows various types of subscription receivers and their exemplary installations. A home subscription receiver 110 is illustrated as being installed in a subscriber's residence 104. An automobile subscription receiver 112 is illustrated as being installed in a car 106 and an office subscription receiver 114 is illustrated as being installed in an office 108. The various types of subscription receivers are able to have similar electrical designs that are adapted for a particular installation. For example, the automobile subscription receiver 112 is adapted to mount in a vehicle and operate from a lower voltage, direct current power source. The home subscription receiver 110 and office subscription receiver 114 are both adapted to operate from conventional AC power but may have different packaging and/or audio connections adapted for installation in the different environments of a home and an office. The home subscription receiver 110 operates with a house mounted antenna 116. The automobile subscription receiver 112 operates with an automotive antenna 118 that is adapted to mount on a vehicle. The office subscription receiver 114 operates with an office antenna 120 that is adapted to mount, for example, in an office environment found in office 108. These antennas all operate to receive the downlink broadcast signal 224 and deliver the received signal to their associated subscription receivers.

In an example of this illustrated embodiment of the present invention, one individual owns the three subscription receivers illustrated in the overall system diagram of the satellite media service 100. In a prior art arrangement, this individual would require three subscriptions, one for each subscription receiver, in order to freely use these three subscription receivers. This individual would be required to pay for these three subscriptions even though only one receiver will be used at a given time. The exemplary embodiments of the present invention provide the ability to activate only the subscription receiver that is located where the individual is at the particular time while the other subscription receivers are either deactivated or activated under another individual's subscription. These exemplary embodiments allow an individual to enjoy listening to any of a number of subscription receivers while restricting receiver activation to only the subscription receiver currently being used.

Figure 2:
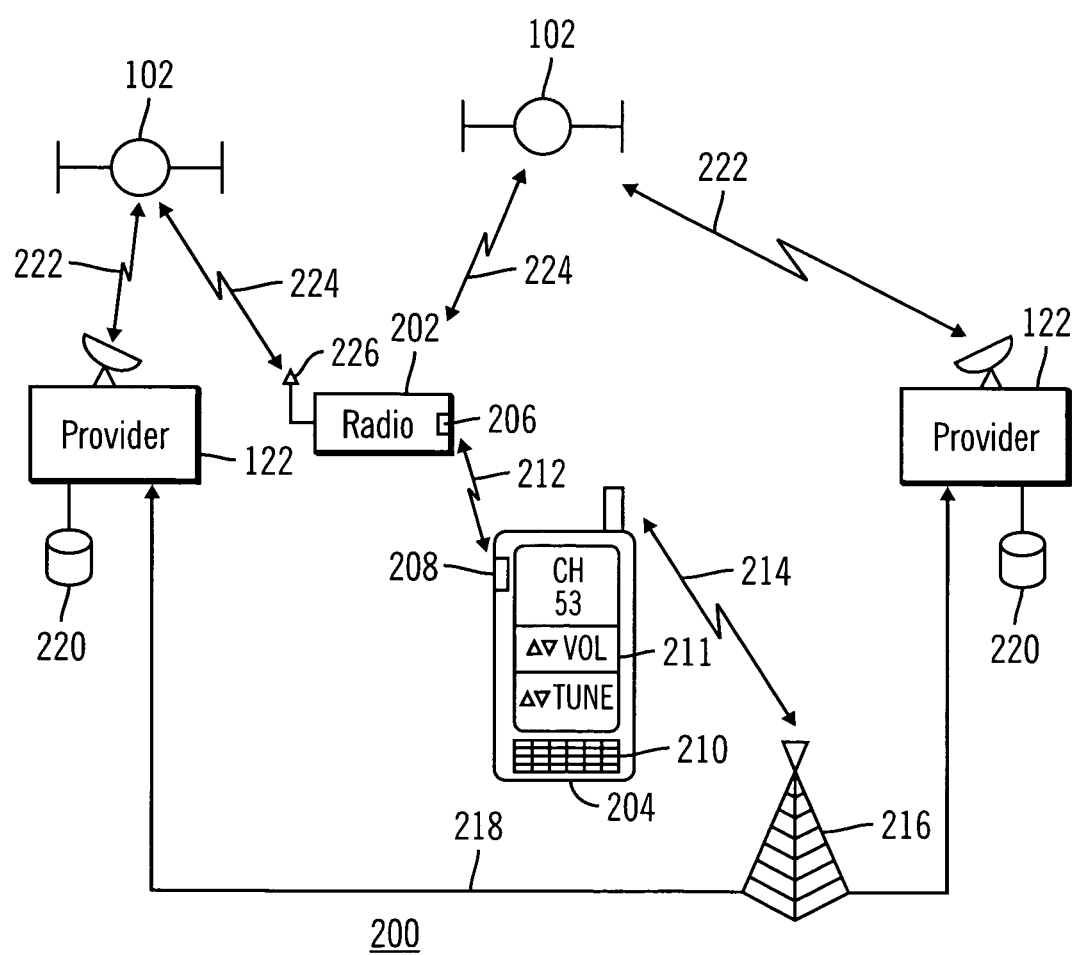
FIG. 2 is an overall system communications interface diagram of a satellite media service with a wireless communication service in accordance with an exemplary embodiment in the present invention.

FIG. 2 is an overall system communications interface diagram 200 of a satellite media service with a wireless communication service in accordance with an exemplary embodiment in the present invention. An exemplary subscription receiver 202 is shown to be receiving downlink broadcast signals 224 from either or both of two satellites 102. The exemplary embodiment illustrated for the overall system communications interface diagram 200, shows two satellites 102 that are each operated by a separate subscription radio service provider. The two subscription radio service providers of this exemplary embodiment correspond, for example, to Sirius Satellite Radio, Incorporated and XM Satellite Radio Holdings, Incorporated.

The subscription receiver 202 illustrated in this exemplary overall system communications interface diagram 200 includes a receiver short range wireless interface 206 that corresponds to the Bluetooth® standard. The receiver short range wireless interface 206 is used to provide control and monitoring functions for the subscription receiver 202 as well as perform the functions associated with requesting subscription receiver authorization. These functions are described in detail below. Further embodiments of the present invention incorporate either wired or wireless interfaces to provide some or all of these functions, including wireless interfaces that operate in accordance with a wireless interface defined by an IEEE 802.11 standard, infrared interfaces and other short range and long range wireless interface protocols.

The receiver short range wireless interface 206 of this exemplary embodiment communicates data over a short range wireless link 212 with a cellular phone/PDA 204. The cellular phone/PDA 204 of the exemplary embodiment includes a cellular phone/PDA short range wireless interface 208 that is compatible with the receiver short range wireless interface 206 and supports bi-directional data communications over the short range wireless link 212, which is also referred to as a first wireless connection. The cellular phone/PDA 204 of the exemplary embodiment includes cellular telephone communications capabilities that support voice and/or data communications over a long range wireless link 214 to a cellular phone provider 216. The long range wireless link 214 is also revered to as a second wireless connection in the following discussion. The cellular phone/PDA 204 of the exemplary embodiment is able to communicate over long range wireless links 214 that utilize either GSM/GPRS or CDMA based cellular telephone networks. It is to be noted that the short range wireless link 212 and the long range wireless link 214 are so designated in this discussion due to their characteristics for this particular exemplary embodiment. Further embodiments are able to communicate the data conveyed by the short range wireless link 212 and the long range wireless link 214 over communications links that have any suitable characteristics.

The cellular phone/PDA 204 of the exemplary embodiment performs conventional voice communications over a cellular telephone link 214. The cellular phone/PDA 204 of the exemplary embodiment is a combination cellular phone and Personal Digital Assistant (PDA) that incorporates a user interface that includes a touch-screen display 211 and keyboard 210. Alternatively the user interface may include button controls only or a combination of button and touch-screen controls. The cellular phone/PDA 204 of the exemplary embodiment includes data processing capabilities that support loading and executing software programs to perform various processing. The software executing on the cellular phone/PDA 204 is able to control, process and otherwise manipulate data that is transmitted and/or received over the short range wireless link 212 or the long range wireless link 214.

The cellular phone/PDA 204 of the exemplary embodiment contains software that operates to control and monitor the operation of the subscription receiver 202. The cellular phone/PDA 204 of the exemplary embodiment executes software that provides a user interface on the touch-screen display 211 of the cellular phone/PDA 204 that displays current operating information for the subscription receiver 202, such as the currently tuned channel number, current song title and artist and/or information such as stock quotes or sports scores. The user interface on the touch-screen display 211 further includes, for example, controls for setting volume ("VOL") and channel tuning ("TUNE") that each have adjacent "up"

and "down" arrows. The display areas around these "up" and "down" arrows is touch sensitive in the exemplary embodiment and a user's touching of these areas of the touch-screen 211 will result in an input to the software executing on the cellular phone/PDA 204 that indicates the desired change in the operation of the subscription receiver 202. The software executing on the cellular phone/PDA 204 will, in response to this input, form a proper command for the subscription receiver 202 and communicate this command through the short range wireless link 212, which is a Bluetooth® link in the exemplary embodiment. The subscription receiver will receive this command and adjust its operation accordingly.

In the operation of the exemplary embodiment of the present invention, the cellular phone/PDA 204 will initially establish a short range wireless link 212 with the subscription receiver 202. After this link is established, the software operating in the cellular phone/PDA 204 queries the subscription receiver for its subscription receiver identification number. The cellular phone/PDA 204 includes another identifier, its own communication device identifier, as is described below. The software operating in the cellular phone/PDA 204 of the exemplary embodiment assembles these two identifiers into an activation request message and transmits that assembled activation request message over a suitable data link that includes the long range wireless link 214. In the exemplary embodiment, the activation request message is able to be carried within, for example, a Short Message Service (SMS) message communicated via a conventional cellular phone data mechanism. Other data communications techniques, such as e-mail or other packet or channel switched communications mechanisms, are employed by further embodiments of the present invention. The subscription request message is communicated over the long range wireless link 214 to a wireless communications provider 216 in the exemplary embodiment and then forwarded through any suitable data communications system, illustrated in this example by data communications link 218, to the proper subscription radio service provider station 122. The cellular phone/PDA 204 of the exemplary embodiment is configured to properly address the activation request message to the proper subscription radio service provider based upon, for example, the subscription radio service provider through which the user has a subscription for subscription radio service. Although this example illustrates the use of a cellular phone system link as a long range wireless link 214, it is clear in light of the present discussion that other wired or wireless links, such as links operating under the an IEEE 802.11 standard and/or links that include conventional telephone communications systems can be utilized to communicate the activation request message from the wireless communications device to the subscription radio service provider 122.

Each of the subscription radio service providers operate associated subscription radio service provider stations 122, which include ground terminals for transmission of programming and subscription receiver activation signals through the uplink broadcast signals 222. The subscription radio service provider stations 122 further include a user-subscription receiver identifier database 220. The user-subscription receiver identifier database 220 stores data pertaining to valid user subscription identifiers and any associated subscription receiver identifiers, as is described below. The processing of systems within the subscription radio service provider station 122 receives, from the data communications link 218, the activation request message from a cellular phone/PDA 204 and then validates that message. The validation processing is dependent upon the type of subscriptions supported by the subscription radio service provider, and is described below. If the activation request is determined to be valid, the processing of systems within the subscription radio service providers 122 then transmits an activation data message over the uplink broadcast signal 222, which is relayed via satellite 102 to the downlink broadcast signal 224 and received by the subscription receiver 202 through antenna 226. Upon receipt of the activation data message, the subscription receiver 202 is then able to properly receive broadcast programming for which the user has a valid subscription. Further processing associated with activation, and subsequent deactivation, of subscription receiver 202 is described in detail below.

Figure 3:
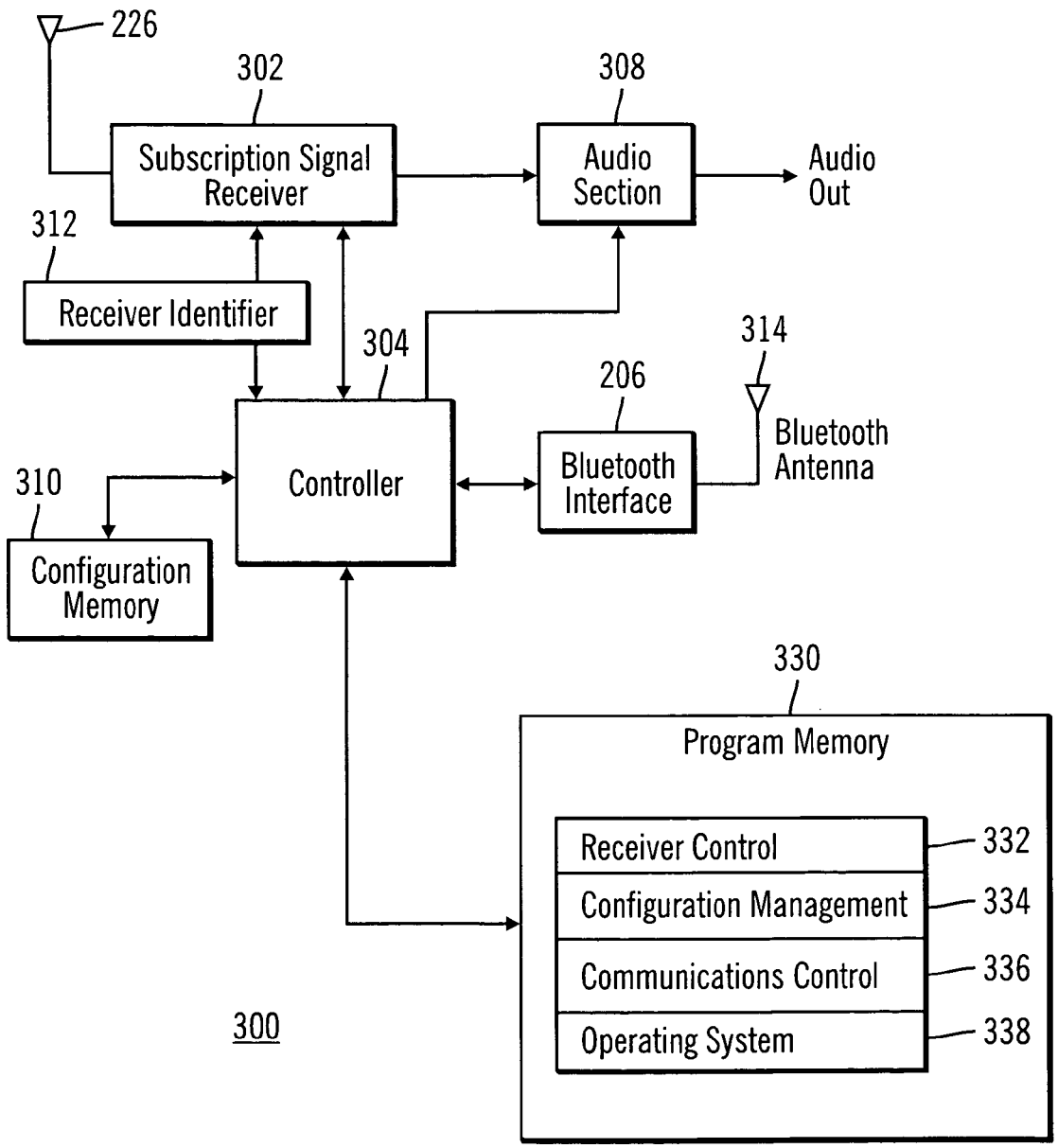
FIG. 3 is a diagram of a satellite media service receiver in accordance with an exemplary embodiment of the present invention.

FIG. 3 is a diagram of a satellite media service receiver 300 in accordance with an exemplary embodiment of the present invention. The exemplary satellite media service receiver 300 is an example of a subscription receiver and includes a controller 304 that includes a programmable microcontroller that provides data storage and device control for other components in the satellite media service receiver. The controller 304 is in communication with non-volatile and volatile memory to store programming instructions and data used in the processing performed by the controller 304. Program memory 330 of the satellite media service receiver 300 stores executable computer executable instructions that control the operation of controller 304. The program memory 330 of the exemplary satellite media service receiver 300 stores software modules including a receiver control module 332, configuration management module 334, communications control module 336 and an operating system module 338. The receiver control module includes software to control operation of the various components of the satellite media service receiver 300, including the subscription signal receiver 320 and audio section 308. The configuration management module 334 includes software to control the configuration of the satellite media service receiver 300, including management of various user preferences and the like. The communications control module 336 includes software to control the Bluetooth interface 206 and perform the bi-directional data communications over the short range wireless link 212 of the exemplary embodiment. The operating system module 338 includes software to control, for example, the basic operation of the controller 304.

The satellite media service receiver also includes a conventional subscription signal receiver 302 that receives control signals, such as channel selections, from the controller 304 and a received RF signal from an antenna 226. The subscription signal receiver further accesses a receiver identifier 312, which is a unique identification value that uniquely identifies the particular satellite media service receiver 300. In order to deter unauthorized access or hacking of the subscription service, downlink signal 224 is encrypted and the subscription receiver 302 is preferably only activated (enabling decryption of the downlink signal) or deactivated in response to signals received from provider 122 through downlink signal 224. The receiver identifier 312 is indicated, for example, in the activation data message sent from the subscription radio service provider to the satellite media service receiver 300. The subscription signal receiver 302 provides an audio output signal to an audio section 308 to produce a suitable, multiple channel, audio output that is ultimately delivered, for example, to audio speakers to produce the desired audio programming.

The satellite media service receiver 300 further contains a configuration memory 310 that is used to store configuration information. Configuration information includes information used in the operation of the satellite media service receiver 300 such as, for example, audio output levels, currently tuned channel, and the like. The Controller 304 of the exemplary embodiment further works through a Bluetooth interface 206 and Bluetooth antenna 314 to support a short range wireless interface 212 to, for example, a cellular phone/PDA 204. The controller 304 provides status information through the Bluetooth interface 206 to the cellular phone/PDA 204 for display, storage, or communication to the subscription radio service provider 122. The Controller 304 further provides required control signals to the subscription signal receiver 302 and the audio section 308 in response to user control inputs received from the cellular phone/PDA 204 through the Bluetooth interface 206. As discussed above and in greater detail below, after initialization of the short range wireless link 212 through the Bluetooth interface 206, the cellular phone/PDA 204 requests the receiver identifier 312 and the controller formats a proper data message containing the receiver identifier 312 for transmission to the cellular phone/PDA in forming an activation request message. Receiver 300 may also have its own supplemental user interface providing for control of the receiver in addition to portable controller 204.

Figure 4:
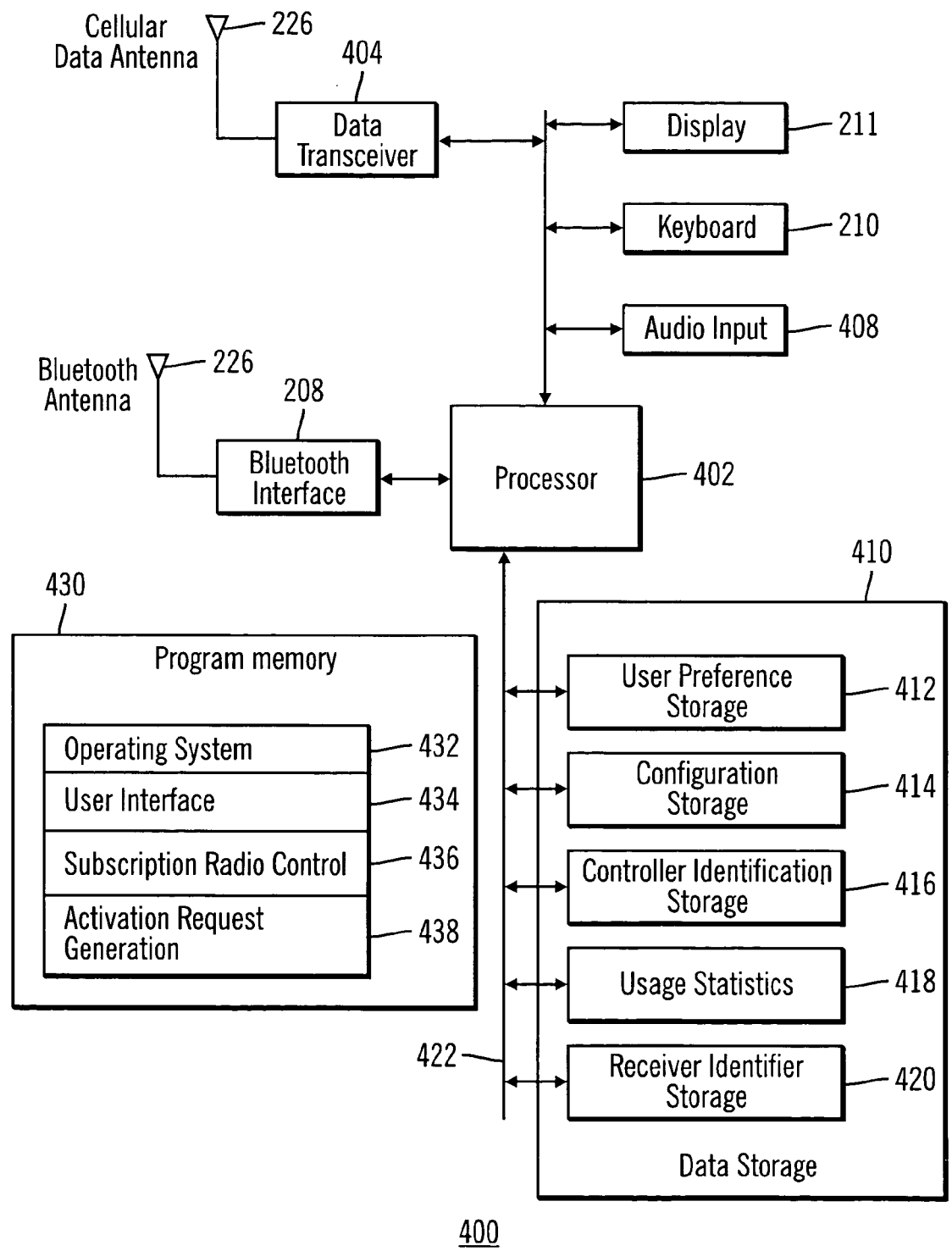
FIG. 4 is a diagram of a wireless communications device with a satellite receiver controller in accordance with an exemplary embodiment of the present invention.

FIG. 4 is a diagram of a wireless communications device 400 with a satellite receiver controller in accordance with an exemplary embodiment of the present invention. The wireless communications device corresponds to the relevant components of the cellular phone/PDA 204 of the above described exemplary embodiment. The wireless communications device 400 includes a processor 402 that is a programmable microcontroller or microprocessor that is configured to perform the processing to implement the operation of the exemplary embodiment of the present invention. That processing is described in detail below. Processor 402 includes volatile and non-volatile data storage to store programming instructions and data used in the processing performed by the processor 402. The processor 402 operates with a Bluetooth interface 208, and Bluetooth antenna 430 to implement the short range wireless link to the subscription receiver 202 in order to exchange data between the wireless communications device 400 and the subscription receiver.

Program memory 430 of the wireless communications device 400 stores executable computer executable instructions that control the operation of controller 402. The program memory 430 of the exemplary wireless communications device 400 stores software modules including an operating system 432, a user interface 434, a subscription receiver control module 436 and an activation request generation 438. The wireless communications device 400 of the exemplary embodiment incorporates a commercially available handheld computer operating system 432 such as Windows Mobile available from Microsoft Corporation of Redmond, Wash. The program memory 430 contains a user interface software module that includes software to control the display of information on the touch-screen display 211 and accepts user inputs received through either one or more of the keyboard 210, the touch-screen display 211 and/or the audio input 408 as is described below. The subscription receiver control module 436 includes processing to implement front panel control of a subscription receiver 202 via commands to the subscription receiver 202 sent over the short range wireless link 212. The activation request generation module operates to generate and transmit a subscription receiver activation request by requesting the subscription receiver identifier from the subscription receiver 202 and transmitting the request to a subscription radio service provider 122 over the long range wireless link 214 through the data transceiver 404.

The wireless communications device 400 includes data storage 410 to store data temporary and quasi-permanent data used by processor 402. The processor 402 of the exemplary embodiment communicates with the data storage 410 via data bus 422. The data storage 410 includes user preference storage 412 that contains user preferences for the subscription receiver 202. The user preferences include, for example, preset channel selections, favorite songs, volume settings, and the like. The data storage 410 includes configuration storage to store user configuration preferences, such as display configurations and the like. The controller identifier storage 416 stores a unique controller identifier for the wireless communications device 400 that uniquely identifies this device. As discussed below, the controller identifier is associated with a particular user account maintained by the subscription radio service provider 122. Examples of controller identifiers stored in the controller identifier storage 416 include, for example, the phone number of the cellular phone/PDA 204, the Electronic Identification Number (EIN) used by the cellular telephone carrier to identify the cellular phone/PDA 204.

Data storage 410 further includes usage statistics 418 that stores, for example, the received broadcast channels that the user has selected to tune the subscription receiver 202 and the times at which the subscription receiver 202 was tuned to each received channel. In an exemplary operational mode, the wireless communications device 400 transmits the accumulated and stored usage statistics 418 to the subscription radio service provider 122 or to another data collection entity. Data storage 420 also stores subscription receiver identifiers received from subscription receivers. Some embodiments of the present invention allow the wireless communications device 400 to be used to control different receivers in a serial fashion, i.e., a first subscription receiver is activated and then the user can move to a second subscription receiver and activate that second subscription receiver. Some embodiments store the receiver identifier of the first subscription receiver in the receiver identifier storage 420 and send a deactivation request for the first subscription receiver when the second subscription receiver is to be activated. Other embodiments of the present embodiments track the deactivation of previously activated subscription receivers at the subscription radio service provider station 122 and may not require storage of the receiver identifier for the first subscription receiver.

The wireless communications device 400 further includes the user interface components of a touch-screen display 211, keyboard 210 and an audio input 408. The processor 402 communicates with these user interface components via data bus 422. The keyboard 210 allows a user to enter alphanumeric data as required and prompted by the touch-screen display 210. The user is also able to provide input by touching designated areas of the touch-screen display 211. Audio input 408 of the exemplary embodiment is able to accept voice commands from a user and use suitable voice recognition processing to convert those voice commands into proper commands to be sent to the subscription receiver 202.

The wireless communications device 400 further includes a data transceiver 404 to communicate data, such as activation requests and usage statistics, to the subscription radio service provider station 122 over a long range wireless link 214. Properly formatted digital messages are formed by processor 402, communicated via data bus 422 to data transceiver 404 for proper modulation and transmission through the cellular antenna 432.

Figure 5:
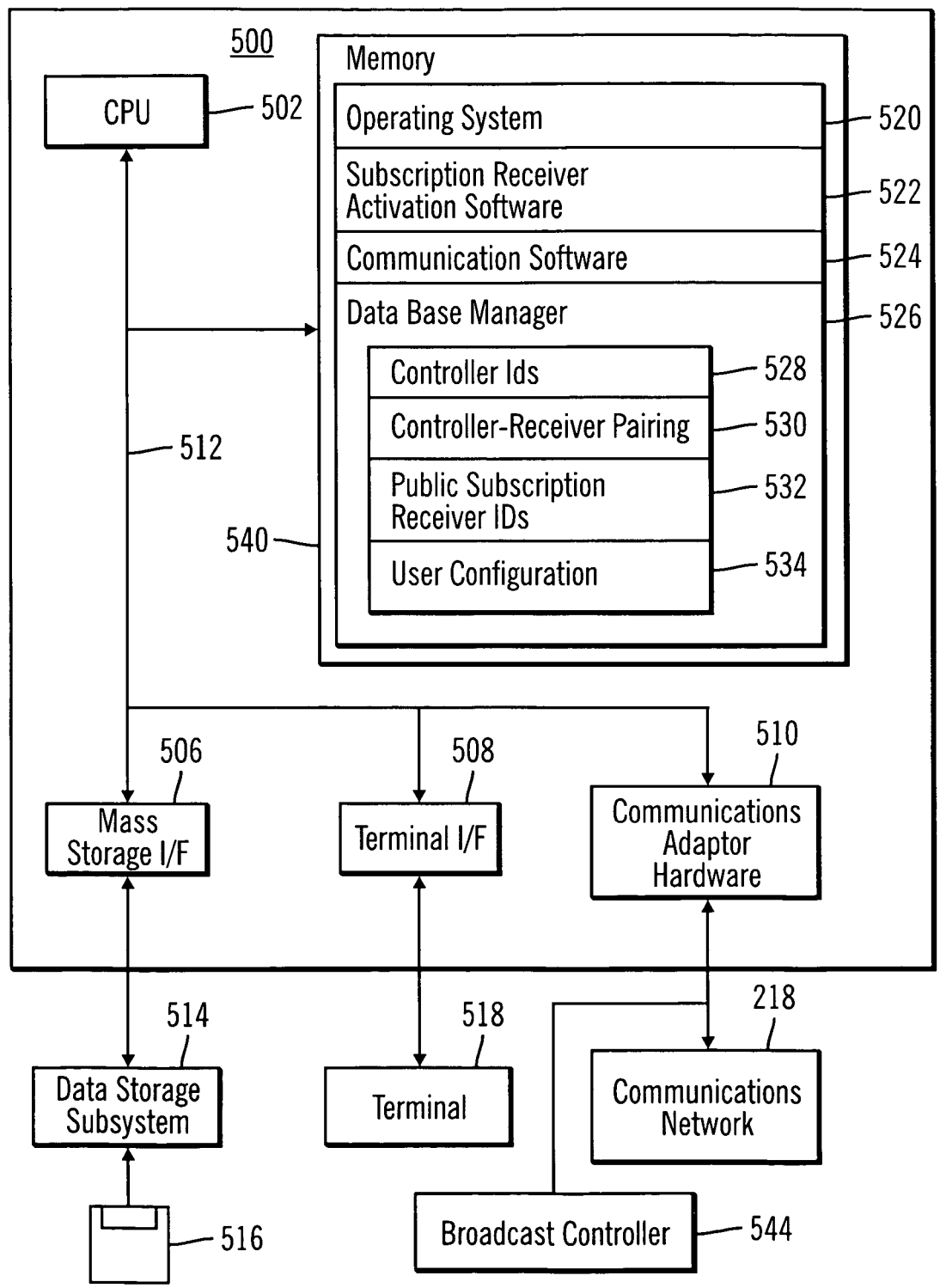
FIG. 5 is a diagram of a computer for a satellite media subscription radio service provider in accordance with an exemplary embodiment of the present invention.

FIG. 5 is a diagram of a computer system 500 for a satellite media subscription radio service provider in accordance with an exemplary embodiment of the present invention. Computer system 500 corresponds to a computer located within the subscription radio service provider 122 of the above described exemplary embodiment. The computer system 500 has a computer processor 530 and various peripheral devices such as a data storage subsystem 514, one or more terminals 518, communications network 218 and another external computer referred to in this example as a broadcast controller 544.

Computer system 500 includes a CPU 502 that executes various computer programs including programs used to implement the exemplary embodiment of the present invention. The computer system 500 includes memory 540 that includes volatile and non-volatile data storage for storing programs and data used by the CPU 502. Memory 540 stores an operating system 520 that controls overall operation of the CPU 502. Memory 540 also stores application programs such as a subscription receiver activation software component 522, a communication software component 524, and a database manager 526. The communication software component 524 performs the processing associated with accepting activation request messages received from data network 218 through communications adaptor hardware 510 and dispatching data to a broadcast controller 544 operated within the subscription radio service provider 122. The broadcast controller 544 operates to transmit activation messages to the subscription receivers.

The subscription receiver activation software 522 accepts activation request messages via the communications software 524, validates the activation requests based upon data stored and maintained by the database manager 526, and determines whether to transmit an activation message via the uplink broadcast signal 222 to the subscription receiver specified in the activation request message. The processing of the subscription receiver activation software is described in further detail below. The subscription receiver activation software of some embodiments of the present invention further performs subscription receiver deactivation determination processing.

The memory 540 also includes a database manager 526 that stores various data used by the processing performed by CPU 502 in conjunction with performing subscription receiver activation and deactivation. Examples of data maintained by the database manager 526 that are shown for this exemplary embodiment include a list of controller identifiers 528, controller-receiver pairings 530, public subscription receiver identifiers 532 and user configurations 534. The public subscription receiver identifiers 532 are a list of subscription receiver identifiers that are associated with public subscription radios. Data stored and maintained by the database manager 526 is generally stored on mass storage devices maintained by a data storage system 514, which is described below. Data maintained by the database manager 526 and operated upon by the processing of other software components, such as the subscription receiver activation software 522, is often temporarily transferred into computer memory 540 for processing. The operation of the subscription receiver activation software 522 and its use of the data stored by the data base manager 526 are described in further detail below. The data storage subsystem 514 is further able to accept and read a computer readable medium 516 that contains data and, for example, computer executable instructions to be loaded into other data storage devices or memory 540.

CPU 502 further communicates through a mass storage interface 506 to a data storage subsystem 514. Data storage subsystem 514 includes mass data storage devices such as disk drives and the like to store data maintained by the database manager 526. The data storage subsystem 514 is able to use a single data mass storage device or distributed mass data storage devices that are collocated or maintained in disparate geographic locations. The data storage subsystem further operates to maintain virtual memory for the computer processor 530 in the exemplary embodiment. The CPU 502 also communicates to one or more external terminals 518 through a terminal interface 508. External terminals 518 are able to be conventional terminals or other user interface devices that execute on other computers that are in data communications with the computer processor 530.

Figure 6:
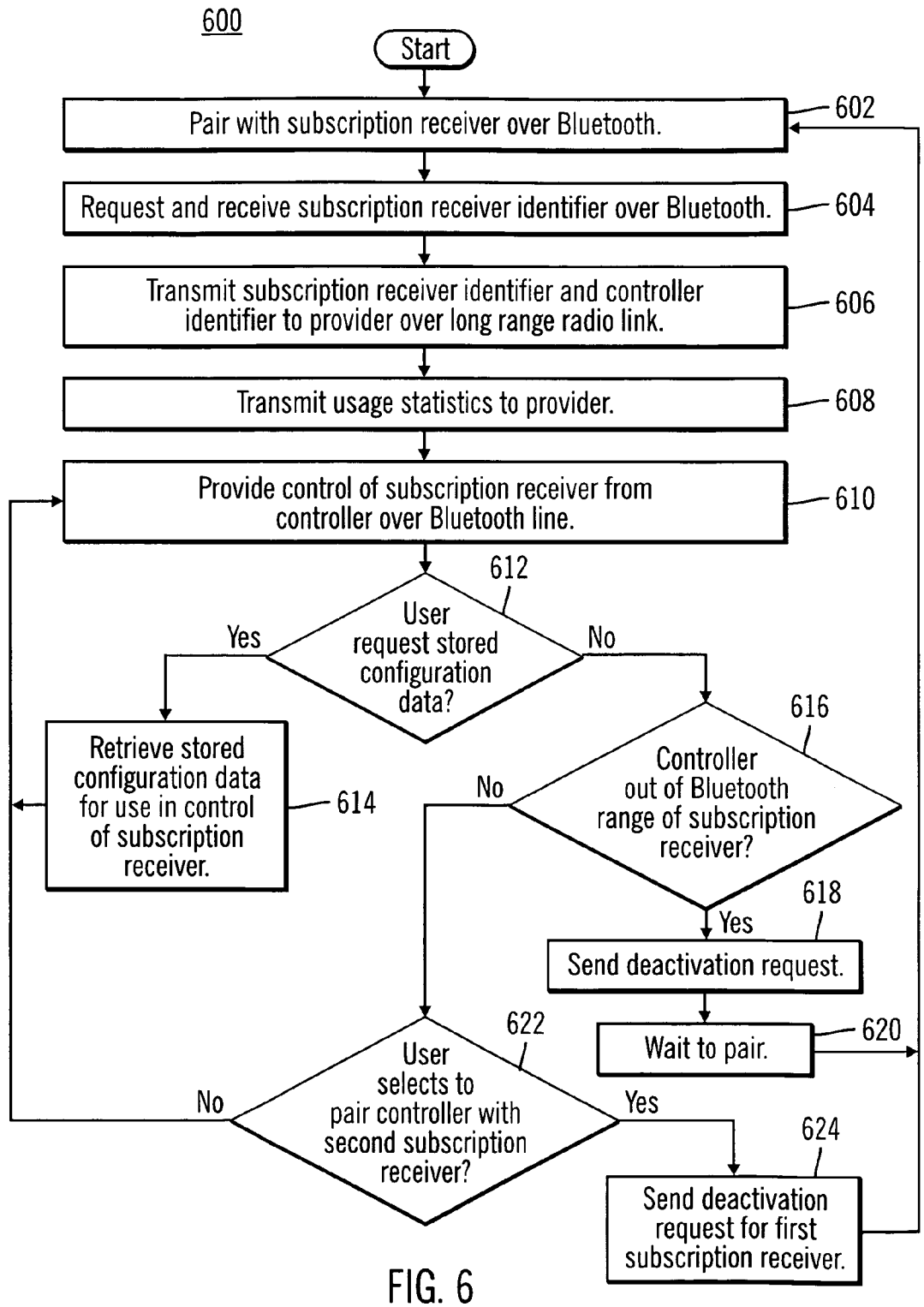
FIG. 6 is a processing flow diagram for the wireless communications device with a satellite receiver controller illustrated in FIG. 4, in accordance with an exemplary embodiment of the present invention.

FIG. 6 is a processing flow diagram 600 for a wireless communications device with a satellite receiver controller 400 as is illustrated in FIG. 4, in accordance with an exemplary embodiment of the present invention. The exemplary wireless communications device processing flow 600 begins by pairing, at step 602, with a subscription receiver over a Bluetooth link. This pairing operation is performed in the exemplary embodiment by using conventional methods. The processing then requests and receives, at step 604, the subscription receiver identifier over the Bluetooth link that has been set up. The processing then transmits, at step 606, the subscription receiver identifier and controller identifier to the subscription radio service provider over a long range radio link. The processing of the exemplary embodiment performs this step by generating an activation request message that contains the received subscription receiver identifier and a controller identifier that is associated with the wireless communications device and/or the user of that device and sending this information in a suitable format and/or protocol.

The processing of the exemplary embodiment then transmits, at step 608, accumulated usage statistics to the subscription radio service provider 122. The wireless communications device with a satellite receiver controller 400 accumulates usage statistics for subscription receivers that it controls. The usage statistics of the exemplary embodiment include, for example, the subscriber receivers being controlled, the channels to which the controlled receivers are tuned, and the time of day at which these values change. Further data items are able to also be accumulated as usage statistics. The processing then provides, at step 610, control of the subscription receiver. The control of the subscription receiver in the exemplary embodiment includes providing channel tuning commands, audio volume adjustment commands, display of current subscription receiver status including currently tuned channel, currently playing title and artist, and the like.

The processing next determines, at step 612, if the user has requested stored configuration data be used to configure the subscription receiver. A user of the wireless communications device with a satellite receiver controller 400 is able at any time to retrieve subscription receiver configuration data and use that stored configuration data to facilitate configuration and control of the subscription receiver. The stored configuration data is able to include, for example, selected favorite channels which the user prefers, audio playback configuration data, favorite song lists, and the like. The stored configuration data of various embodiments of the present invention is able to be stored in the wireless communications device with a satellite receiver controller 400 itself or at a remote database, such as the database manager 526 operated by the subscription radio service provider. Configuration data stored in a remote database is able to be communicated to the wireless communications device with a satellite receiver controller 400 over, for example, a data link including the long range wireless link 214.

If the user requests to retrieve stored configuration data, the processing continues by retrieving, at step 614, stored configuration data for use in the control of the subscription receiver. The processing of the exemplary wireless communications device with a satellite receiver controller 400 uses this configuration in, for example, presenting options to the user or in initially configuring the subscription receiver. After retrieving the stored configuration data, the processing returns to providing, at step 610, control of the subscription receiver.

If the user did not request retrieving stored configuration data, the processing advances to determining, at step 616, if the wireless communications device with a satellite receiver controller 400 is out of Bluetooth communication link range with the subscription receiver being controlled. This condition is determined to be met in the exemplary embodiment if the wireless communications device with a satellite receiver controller 400 is not able to communicate with the subscription receiver. If the wireless communications device with a satellite receiver controller 400 is determined to be out of Bluetooth communications range, the processing of some embodiments then sends, at step 618, a deactivation request to the subscription radio service provider using the same communications means as is used for sending an activation request. This step is an optional step and some other embodiments do not transmit a deactivation request until after the wireless communications device has paired with a second subscription receiver or after pairing with a second subscription receiver and transmitted an activation request for the second receiver. Still further embodiments of the present invention include wireless communications devices that do not send a deactivation request upon moving out of Bluetooth range of the subscription receiver. In embodiments where the wireless communications device does not send a deactivation request, a deactivation signal is automatically sent from the subscription radio service provider 122 upon the occurrence of some event, such as the receipt of an activation request from this wireless communications device with a satellite receiver controller 400 specifying a different subscription receiver. The processing then waits, at step 620, to pair with a subscription receiver over its Bluetooth link and returns to the pairing processing, at step 602.

If the wireless communications device with a satellite receiver controller 400 is determined to not be out of Bluetooth range, the processing determines, at step 622, if the user has selected to pair the wireless communications device with a satellite receiver controller 400 with a second subscription receiver. If the user has not selected to do so, the processing returns to providing control of the subscription receiver, at step 610. If the user does select to pair the wireless communications device with a satellite receiver controller 400 with a second subscription receiver, the processing of some embodiments of the present invention sends, at step 624, a deactivation request for the first subscription receiver, with which the wireless communications device with a satellite receiver controller 400 was initially paired. Other embodiments do not send this deactivation request and rely upon the subscription radio service provider to automatically deactivate the first subscription receiver if such deactivation is necessary. The processing then returns to pairing, at step 602, the wireless communications device with a satellite receiver controller 400 with the second subscription receiver over the Bluetooth link.

Figure 7:
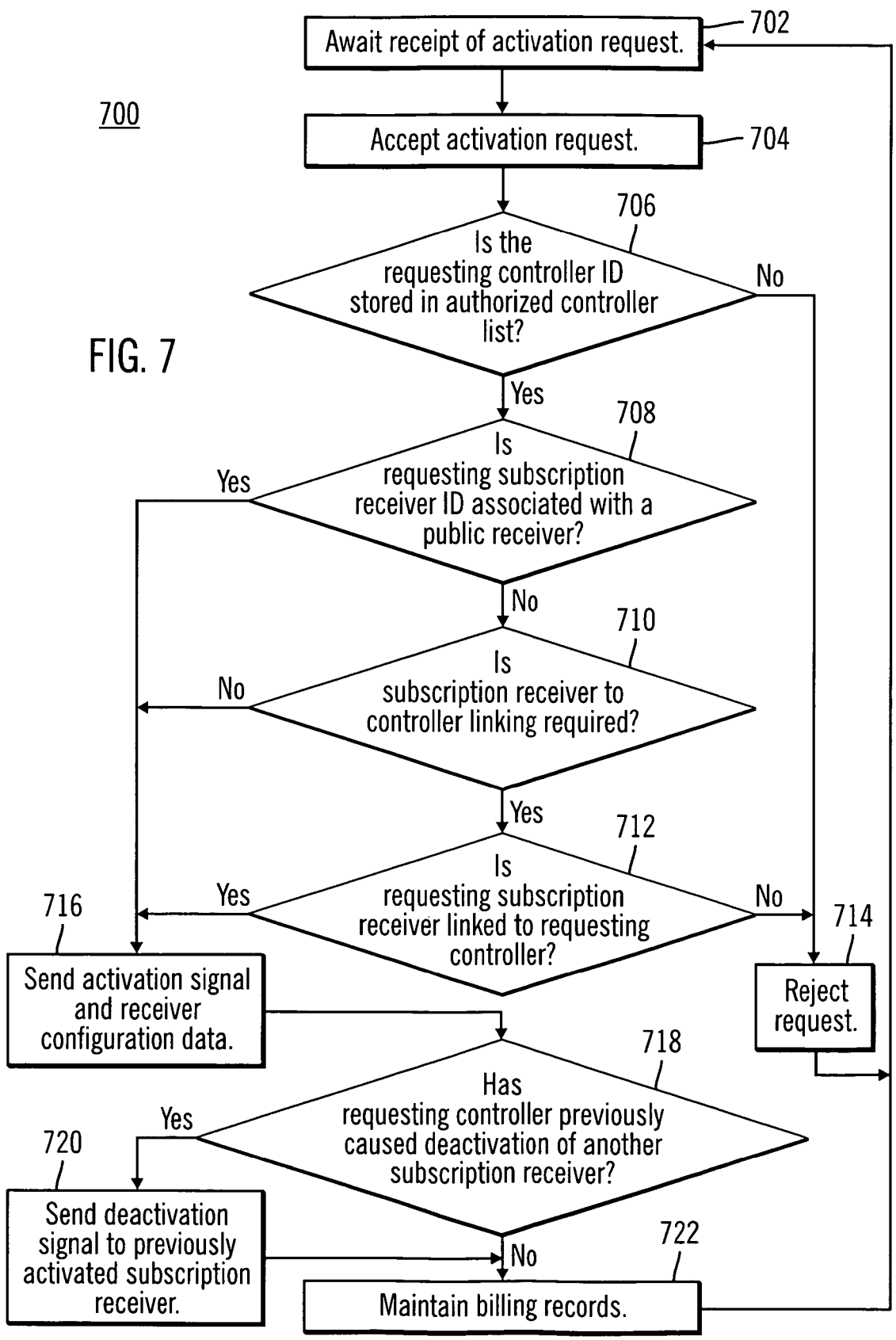
FIG. 7 is a processing flow diagram for the computer satellite media subscription radio service provider computer illustrated in FIG. 5, in accordance with an exemplary embodiment of the present invention.

FIG. 7 is a processing flow diagram 700 for the satellite media subscription radio service provider computer 500 illustrated in FIG. 5, in accordance with an exemplary embodiment of the present invention. The satellite media subscription radio service provider computer processing flow 700 begins by awaiting, at step 702, for receipt of an activation request from a wireless communications device with satellite receiver controller 400. The processing then proceeds to accepting, at step 704, the activation request and then determining, at step 706, if the requesting controller identifier contained in the received activation request is stored in the authorized controller list. The authorized controller list is maintained in a database within the satellite media subscription radio service provider computer 500 and contains a list of controller identifiers that are authorized to activate subscription receivers. For example, users who have subscriptions with the satellite radio subscription radio service provider 122 that allow the portable activation of the present invention have controller identifiers stored in this database. This processing step ensures that a subscription request originates from a valid requestor. If the requesting controller identifier is not stored in the authorized controller list, the processing rejects, at step 714, the activation request and returns to await, at step 702, receipt of another activation request.

If the requesting controller identifier is stored in the authorized controller list, the processing determines, at step 708, if the requesting subscription receiver identifier 708, which is the subscription receiver identifier contained in the received authorization request, is associated with a public receiver. Some embodiments of the present invention support defining "public receivers" which are subscription receivers that any controller is able to activate. Such public receivers may be located in, for example, restaurants, coffee houses, hotel rooms, rental automobiles, and other such places. If the requesting subscription receiver identifier is a public receiver, the processing causes the sending, at step 716, of an activation signal to the subscription receiver. Some embodiments of the present invention further send, also at step 716, receiver configuration data that is defined by one or both of the subscription radio service providers and/or the user, and that is stored at the satellite media subscription radio service provider computer 500.

If the requesting subscription receiver identifier is determined to not be associated with a public radio, the processing determines, at step 710, if subscription receiver to controller linking is required. Some embodiments of the present invention require linking of controllers and subscription receivers so that a particular requesting controller can only successfully request activation of specified subscription receivers. For example, a user can be limited to only requesting activation of subscription receivers that he or she owns and cannot request activation of other's subscription receivers. If subscription receiver to requesting controller linking is required, the processing advances to determining, at step 712, if the requesting subscription receiver is linked to the requesting controller. This linking is specified by data maintained in the database 220 that is maintained by the subscription radio service provider. If the requesting subscription receiver is not linked to the requesting controller, the request is rejected, at step 714, and the processing awaits, at step 702, receipt of another activation request.

If subscription receiver to requesting controller linking is not determined to be required or if linking is required and the requesting controller is linked to the requesting subscription receiver, the processing causes the sending, at step 716, of an activation signal to the subscription receiver. The processing of some embodiments of the present invention next determines, at step 718, if the requesting controller has previously caused deactivation of another subscription receiver. In these embodiments, the requesting controller is not required to send deactivation requests upon sending a request to activate a subsequent subscription receiver, which was described as an optional step above. If the requesting controller is trusted to send such a deactivation request, the determination of a prior activation by this requesting controller may not be required. If it is determined that the requesting controller has requested activation of another subscription receiver, the processing sends, at step 720, a deactivation signal to the previously activated subscription receiver. In the exemplary embodiment of the present invention, the satellite media subscription radio service provider computer 500 stores the subscription receiver identifier of the subscription receiver that was last activated by each wireless communications device. Upon receipt of an activation request from a particular wireless communications controller, the satellite media subscription radio service provider computer 500 determines accesses this stored subscription identifier to determine which subscription receiver is to be sent a deactivation signal. The processing then maintains, at step 722, billing records to record the activation and possible deactivation of receivers for the user's account associated with the requesting controller identifier. The processing then returns to awaiting, at step 702, the receipt of another activation request. The transmission of activation and deactivation signals is performed in the exemplary embodiment by conventional means.

Figure 8:
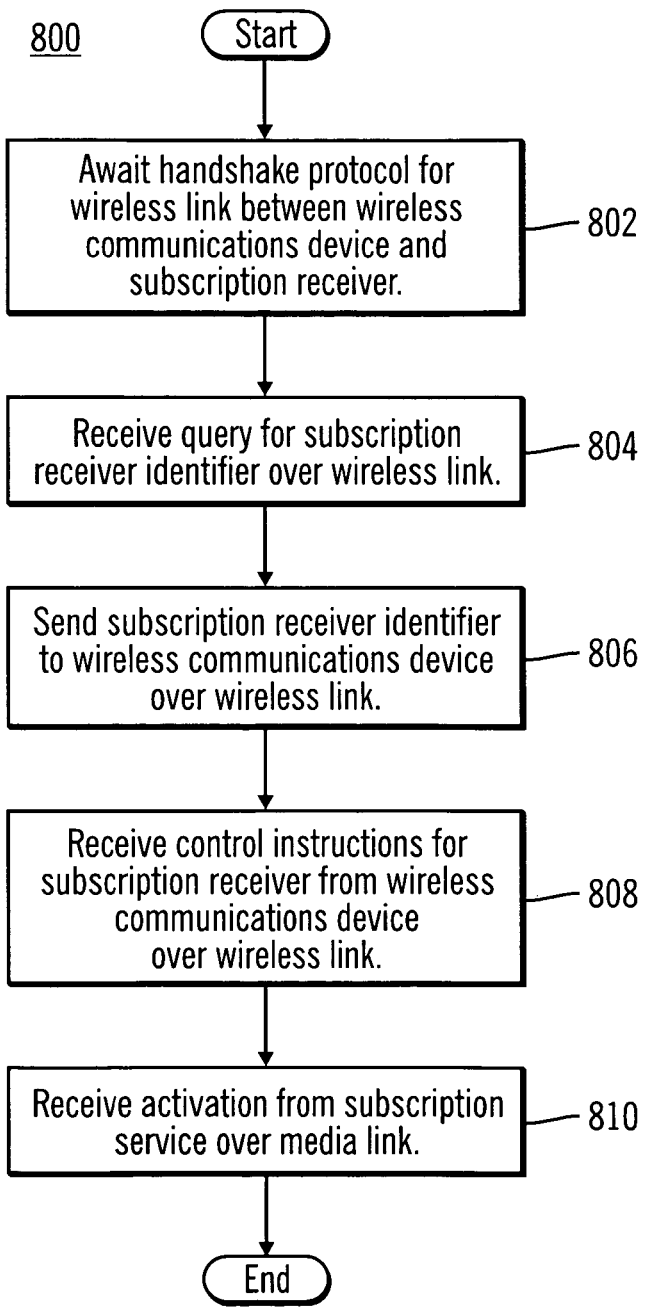
FIG. 8 is a processing flow diagram for a satellite media service receiver in accordance with an exemplary embodiment of the present invention.

FIG. 8 is a processing flow diagram 800 for a satellite media service receiver 300, as illustrated in FIG. 3, in accordance with an exemplary embodiment of the present invention. The processing of the satellite media service receiver 300 begins by awaiting, at step 802, for the handshake protocol to be initiated between a wireless communications device and this satellite media service receiver. The processing then receives, at step 804, a query for the subscription receiver identifier over the established wireless link. The processing then sends, at step 806, the subscription receiver identifier for this subscription receiver to the wireless communications device over the wireless link. The processing next receives, at step 808, control instructions for the subscription receiver from the wireless communications device over the wireless link. The processing next receives, at step 810, an activation signal from the subscription radio service provider over the broadcast signal media link. Upon receipt and acceptance of the activation signal, the satellite media service receiver 300 is activated and is configured, in response to accepting the activation signal, to receive subscription radio services.

Figure 9:
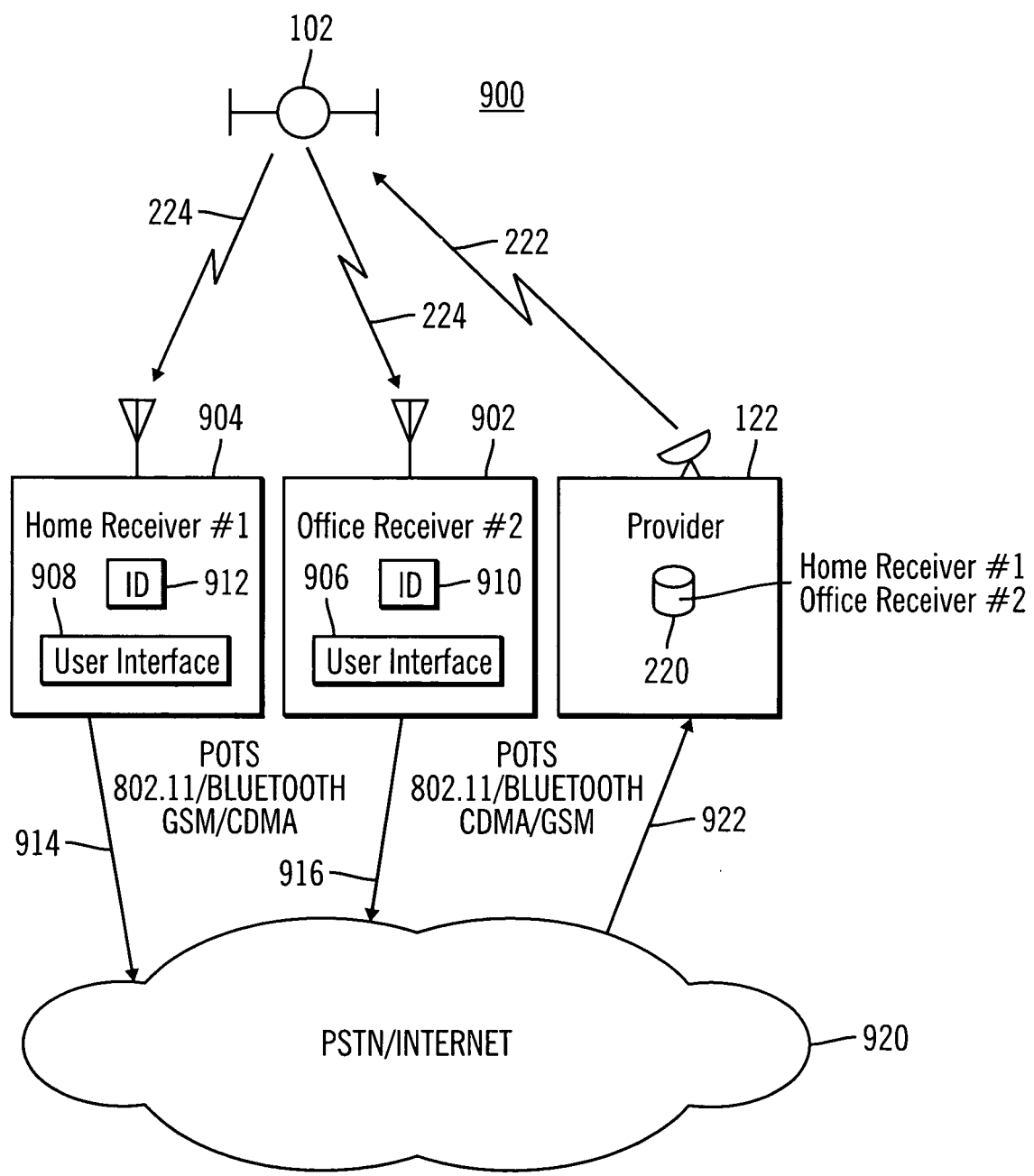
FIG. 9 is a diagram illustrating data communications interconnections between two commonly owned satellite media service receivers in accordance with an exemplary embodiment of the present invention.

FIG. 9 is a diagram illustrating data communications interconnections between two commonly owned satellite media service receivers in accordance with an exemplary embodiment of the present invention. This exemplary configuration includes two subscription receivers, office receiver 902 and home receiver 904, that are installed in an individual's home and office. In this example, these two subscription receivers are owned by the same individual who would like to listen to one or the other of these two subscription receiver by using a portable subscription. The home receiver 904 is designated as receiver #1 in this example and office receiver 902 is designated as receiver #2. Home receiver 904 has a unique home subscription receiver identifier 912 and office receiver 902 has its own office subscription receiver identifier 910. Each of these subscription receivers also has a user interface, including, respectively, the office receiver user interface 906 that is associated with the office receiver 902 and the home receiver user interface 906 that is associated with the home receiver 904. These user interfaces are either part of the subscription receiver itself, are detachable and coupled to the subscription receiver over a wired or wireless link, are portable devices including Bluetooth enabled cellular phone/PDAs, or are any other suitable user interface apparatus that is able to provide user interface functions for its associated subscription receiver.

These respective user interfaces allow a user to initiate an activation request for its associated subscription receiver. As an example, a user is able to request activation of home receiver 904 by properly entering the request via the home receiver user interface 908. The home receiver user interface 908 is able to have a button simply marked "activate" which is pressed by the user to initiate the activation request. User interfaces of further embodiments may require other user operations to initiate an activation request. Once the user has initiated the activation request of the home receiver 904 through the home receiver user interface 908, the processing of the subscription receiver generates an activation request message that includes the home receiver identifier 912. This activation request is transmitted to the provider 122 through an appropriate data channel. The provider 122 of this exemplary embodiment receives the subscription request a PSTN/Internet communications structure 920, which includes one of, or a combination of, the public switched telephone network (PSTN) and/or the Internet. The subscription receivers, such as home receiver 904, is able to communicate with the PSTN/Internet communications structure 920 over any suitable data communications connection, such as, for example, Plain Old Telephone Service (POTS), relatively short range wireless data links based upon an IEEE 802.11 standard or the Bluetooth standard, or a cellular phone data link based upon GSM or CDMA radio links.

The home receiver 904 communicates with the PSTN/Internet structure 920 over a home link 914 and the office receiver 902 communicates with the PSTN/Internet structure 920 over an office link 916. The provider 122 receives the activation request over the provider link 922.

Provider 122 maintains a database 220 that stores, in association with each other, the subscription receiver identifiers that are registered under each portable subscription. In this example, this particular user has home receiver 904 and office receiver 902 registered under one portable subscription which allows only one subscription receiver to be activated at a time.

Once the provider 122 receives the activation request from, as in this example, home receiver 904, the provider examines database 220 to determine which other subscription receivers are also registered under this user's portable subscription. The activation request in this request is generated by the home receiver 904 and includes the home receiver identifier 912. Upon receipt of this activation request, the processing of the provider searches database 220 to determine other receivers that are registered under this user's portable subscription. In this example, this search retrieves the home receiver identifier from database 220, and the association of the home receiver identifier with the office receiver identifier is also retrieved because these two identifiers are registered under the same portable subscription and the database 220 stores this association.

Upon receipt of the activation request from the home receiver 904, which includes the home receiver identifier 912, the processing performed by the provider 122 automatically transmits, via uplink broadcast signal 222 and downlink broadcast signal 224, a deactivation signal to the office receiver 902. This deactivation signal includes the office receiver identifier 910 and cause the deactivation of the office receiver. The processing performed by provider 122 also transmits an activation signal to the home receiver 904. This activation signal includes the home receiver identifier 912.

The above described operation of this exemplary embodiment of the present invention advantageously provides that an activation request from one subscription receiver causes the deactivation of the user's other subscription receiver(s) as well as activation of the receiver through which the activation request was initiated.

Some embodiments of the present invention incorporate different data base designs for the data stored in database 220. For example, a simple association of all subscription receivers registered under a particular portable subscription is able to be stored so that an activation request from one of these subscription receivers causes a deactivation signal to be transmitted to all of that user's other subscription receivers. Other data base designs may include an indicator of which, if any, subscription receivers are currently activated and the deactivation signal is only sent to the currently activated subscription receiver.

The operation of the exemplary embodiments of the present invention are able to incorporate various subscription plans to support the activation of multiple subscription receivers. For example, a user may be offered a subscription plan where only one subscription receiver of a specified set of receivers can be activated at a time, but the user is free to select and change the activated receiver at will. This subscription plan may be offered at a cost that is greater than that normally charged to activate a single subscription receiver, but less than would be charged to activate two or a certain number of receivers.

Non-limiting Software and Hardware Examples

Embodiments of the invention can be implemented as a program product for use with a computer system such as, for example, the computing environment shown in FIG. 1 and described herein. The program(s) of the program product defines functions of the embodiments (including the methods described herein) and can be contained on a variety of computer readable media. Illustrative computer readable medium include, but are not limited to: (i) information permanently stored on non-writable storage medium (e.g., read-only memory devices within a computer such as CD-ROM disk readable by a CD-ROM drive); (ii) alterable information stored on writable storage medium (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It is also clear that given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.) It should be appreciated that the invention is not limited to the specific organization and allocation or program functionality described herein.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

Each computer system may include, inter alia, one or more computers and at least a signal bearing medium allowing a computer to read data, instructions, messages or message packets, and other signal bearing information from the signal bearing medium. The signal bearing medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the signal bearing medium may comprise signal bearing information in a transitory state medium such as a network link and/or a network interface, including a wired network or a wireless network, that allow a computer to read such signal bearing information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for controlling and requesting activation of a subscription activated media receiver from a wireless communications device, comprising:

establishing a first wireless connection between a portable wireless communications device and a first subscription activated media receiver, said media receiver being separate from the portable wireless communications device;

requesting and receiving, through the first wireless connection, at least one subscription receiver identifier from the subscription activated media receiver; and transmitting, from the portable wireless communications device through a second wireless connection, at least one activation request message to at least one subscription service provider, the activation request message comprising the first subscription receiver identifier and at least one controller identifier for identifying at least one existing subscription account with the subscription service provider associated with the portable wireless communications device; and controlling, via said first wireless connection, the operation of the first subscription receiver from the portable wireless communications device.

2. The method of claim 1, wherein the first wireless connection is at least one wireless connection conforming to at least one of a Bluetooth standard, an IEEE 802.11 standard, and an infrared controller standard.

3. The method of claim 1, wherein the second wireless connection comprises at least one of a cellular communications system data link and a data link conforming to an IEEE 802.11 standard.

4. The method of claim 1, wherein the portable wireless communications device comprises at least one of a cellular telephone, a two-way text messaging device, a two-way multimedia messaging device, and a personal digital assistant.

5. The method of claim 1, wherein the first subscription activated media receiver receives at least one satellite broadcast radio signal, the first subscription activated media receiver accepts at least one activation signal and is configured, in response to accepting the activation signal, to receive subscription radio services transmitted on the satellite broadcast radio signal.

6. The method of claim 1, wherein the controller identifier comprises at least one of a cellular phone electronic serial number, electronic identification number, and a subscriber number associated with an individual.

7. The method of claim 1, further comprising:
providing channel selection commands to the first subscription activated media receiver and monitoring channels to which the first subscription activated media receiver is tuned; and
wherein the method further comprises:
transmitting, over the second wireless connection to a data collection facility, the channels to which the first subscription activated media receiver is tuned.

8. The method of claim 1, further comprising:
determining that the wireless communications device is unable to communicate with the first subscription activated media receiver; and
transmitting, in response to the determining, at least one deactivation request for the subscription activated media receiver.

9. The method of claim 1, further comprising:
receiving, through the first wireless connection, at least one second subscription receiver identifier from a second subscription activated media receiver; and
transmitting, through the second wireless connection, at least one second activation request message from the wireless communications device to the subscription service provider, the second activation request message comprising the second receiver identifier and the controller identifier.

10. The method of claim 9, further comprising transmitting, through the second wireless connection, at least one deactivation request for the first subscription activated media receiver.

11. The method of claim 1, further comprising:
storing at least one subscription receiver configuration data item, the subscription receiver configuration data item comprising at least one of:
at least one preset channel selection definition,
at least one preferred artist,
at least one preferred song title,
at least one subscription receiver configuration setting; and
wherein said controlling of said first subscription receiver comprises said portable wireless device accessing the subscription receiver configuration data item.

12. The method of claim 10, further comprising transmitting, over the first wireless connection, a subscription receiver configuration data item to the subscription activated media receiver, said subscription receiver configuration data item comprising at least one of: at least one preset channel selection definition, at least one preferred artist, at least one preferred song title, and at least one subscription receiver configuration setting.

13. The method of claim 12, further comprising transmitting, over the first wireless connection, the subscription receiver configuration data item to a second subscription activated media receiver.

14. A computer implemented method, performed on a computer coupled to a subscription media transmitter, for processing at least one an activation request message for at least one a subscription activated media receiver, the method comprising:
receiving at least one activation request message over a first wireless connection from a portable wireless communications device for activating a first subscription media receiver to receive subscription based media broadcasts under an existing subscription, the activation request message comprising at least (i) one a subscription receiver identifier indicative of the first subscription media receiver and (ii) a controller identifier identifying at least one existing subscription account with the subscription service provider associated with the portable wireless communications device; and
the activation request message having been received over a telecommunications link from a portable telecommunications device and the controller identifier identifying either said portable telecommunications device or a user; and
transmitting over a wireless broadcast channel:
(i) an activation signal to the first subscription media receiver, and
(ii) at least one a deactivation signal to a second subscription media receiver associated with at least one a second requesting subscription receiver identifier and associated with said existing subscription account,
wherein said portable wireless communications device is separate from said first subscription media receiver and from said second subscription media receiver.

15. The method of claim 14 further comprising: transmitting, over the wireless broadcast channel, an activation signal to the first subscription media receiver that is associated with the at least one requesting subscription receiver identifier.

16. The method of claim 14, further comprising:
storing at least one controller identifier, each of the at least one controller identifier being associated with a respective controller authorized to request activation of subscription activated media receivers; and
validating the activation request message received over the first wireless link, wherein the transmitting is performed in response to the validating.

17. The method of claim 14, further comprising:
storing at least one public subscription receiver identifier, each of the at least one public subscription receiver identifier being associated with a respective public subscription activated media receiver that is authorized to receive activation signals in response to validation of activation request messages, and
wherein the validating comprises determining that the requesting controller identifier is contained within the stored at least one controller identifier and that the requesting subscription receiver identifier is contained within the at least one public subscription receiver identifier.

18. The method of claim 14, further comprising:
accepting, over the telecommunications link, at least one second activation request message, the second activation request message comprising at least one second requesting subscription receiver identifier and the requesting controller identifier;
validating the second activation request message;
transmitting, in response to validating the second activation request message, at least one activation signal to a second subscription receiver associated with the second requesting subscription receiver identifier; and
transmitting, in response to validating the second activation request message, at least one deactivation signal to the first subscription receiver.

19. The method of claim 14, wherein said storing further comprises storing, in association with each of the at least one controller identifier, at least one subscription receiver data item, the subscription receiver data item comprising at least one of:
at least one preset station definition,
at least one preferred artist,
at least one preferred song title,
at least one subscription receiver configuration setting; and
wherein the transmitting further comprises transmitting the subscription receiver data item to the subscription activated media receiver.

20. The method of claim 14 wherein the validating comprises determining that the requesting controller identifier is contained within the stored at least stored one controller identifier.

21. The method of claim 20, further comprising: storing at least one subscription receiver identifier, and wherein the validating further comprises determining that the requesting subscription receiver identifier is contained within the at least one stored subscription receiver identifier.

22. The method of claim 14, further comprising:
receiving, over the telecommunications link, at least one second subscription receiver identifier associated with a second subscription activated media receiver; and
transmitting, over the wireless broadcast channel, at least one second activation signal to the second subscription media receiver.

23. The method of claim 22, further comprising transmitting, over the wireless broadcast channel, at least one deactivation message to the subscription media receiver.

24. The method of claim 14, further comprising:
storing at least one association of a stored subscription receiver identifier to one particular controller identifier that is stored within the at least one controller identifier, and
wherein the validating comprises determining if the requesting subscription receiver identifier and the requesting controller identifier are both contained within one association within the at least one association.

25. The method of claim 24, wherein the association comprises at least one association between the stored controller identifier and a plurality of stored subscription receiver identifiers.

26. The method of claim 24, further comprising:
validating a plurality of activation request messages;
determining a number of unique requesting subscription receiver identifiers that are contained within the plurality of activation request messages that contain the requesting controller identifier; and
maintaining billing records based upon the number.

27. A method for activating subscription radios, the method comprising:
providing, through a first wireless connection, control of a subscription activated media receiver from a portable wireless communications device that is separate from a subscription activated media receiver;
receiving, through the first wireless connection, at least one subscription receiver identifier from the subscription activated media receiver;
transmitting, through a second wireless connection, at least one activation request message from the portable wireless communications device to at least one subscription service provider, the activation request message comprising the subscription receiver identifier and at least one controller identifier for identifying at least one account associated with the wireless communications device;
accepting, at a subscription service provider over a telecommunications link that comprises the second wireless connection, the activation request data message;
storing, at the subscription service provider, at least one authorized controller identifier, each of the at least one authorized controller identifier being associated with a respective controller authorized to request activation of subscription activated media receivers;
validating the activation request; and
transmitting over a wireless broadcast channel, in response to the validating, at least one activation signal to the subscription activated media receiver.

28. A method for controlling and requesting activation of a subscription activated media receiver from a wireless communications device, comprising:
establishing a first wireless connection between a portable wireless communications device and a first subscription activated media receiver, said media receiver being separate from the portable wireless communications device;
requesting and receiving, through the first wireless connection, at least one subscription receiver identifier from the subscription activated media receiver; and
transmitting, from the portable wireless communications device through a second wireless connection, at least one activation request message to at least one subscription service provider, the activation request message comprising the first subscription receiver identifier and at least one controller identifier for identifying at least one existing subscription account with the subscription service provider associated with the portable wireless communications device; and
transmitting, through the second wireless connection, at least one deactivation request for another subscription activated media receiver.

* * * * *